United States Patent [19]

Cornelius et al.

[11] 4,006,860
[45] Feb. 8, 1977

[54] METHOD AND APPARATUS FOR TRANSPORTING AN IRRIGATION LINE

[75] Inventors: Gail Cornelius, Portland; Lloyd C. Olson, Beaverton, both of Oreg.

[73] Assignee: R. M. Wade & Co., Portland, Oreg.

[22] Filed: June 12, 1975

[21] Appl. No.: 586,419

[52] U.S. Cl. .............................. 239/212; 180/24.08
[51] Int. Cl.[2] ........................................ B05B 3/02
[58] Field of Search ................ 214/1 P; 180/24.08, 180/24.09, 24.11, 44 R, 2; 239/212, 177; 137/344

[56] References Cited
UNITED STATES PATENTS

| | | | |
|---|---|---|---|
| 3,072,268 | 1/1963 | Purtell | 239/212 X |
| 3,498,542 | 3/1970 | Hefner et al. | 137/344 X |
| 3,771,719 | 11/1973 | Raso et al. | 137/344 X |
| 3,923,249 | 12/1975 | Mortimer | 239/212 |
| 3,929,197 | 12/1975 | Malott et al. | 239/212 X |

Primary Examiner—Stanley H. Tollberg
Attorney, Agent, or Firm—Phillips, Moore, Weissenberger, Lempio & Strabala

[57] ABSTRACT

Disclosed herein is a mobile transport assembly which may be moved to adjacent an irrigation line, and which includes means for selectively applying rotational torque to such irrigation line at an area between the ends of such irrigation line, to in turn rotate and transport the irrigation line. The mobile transport assembly may then be moved from such irrigation line after the transporting thereof to another irrigation line to in turn move that irrigation line by applying rotational torque thereto.

47 Claims, 12 Drawing Figures

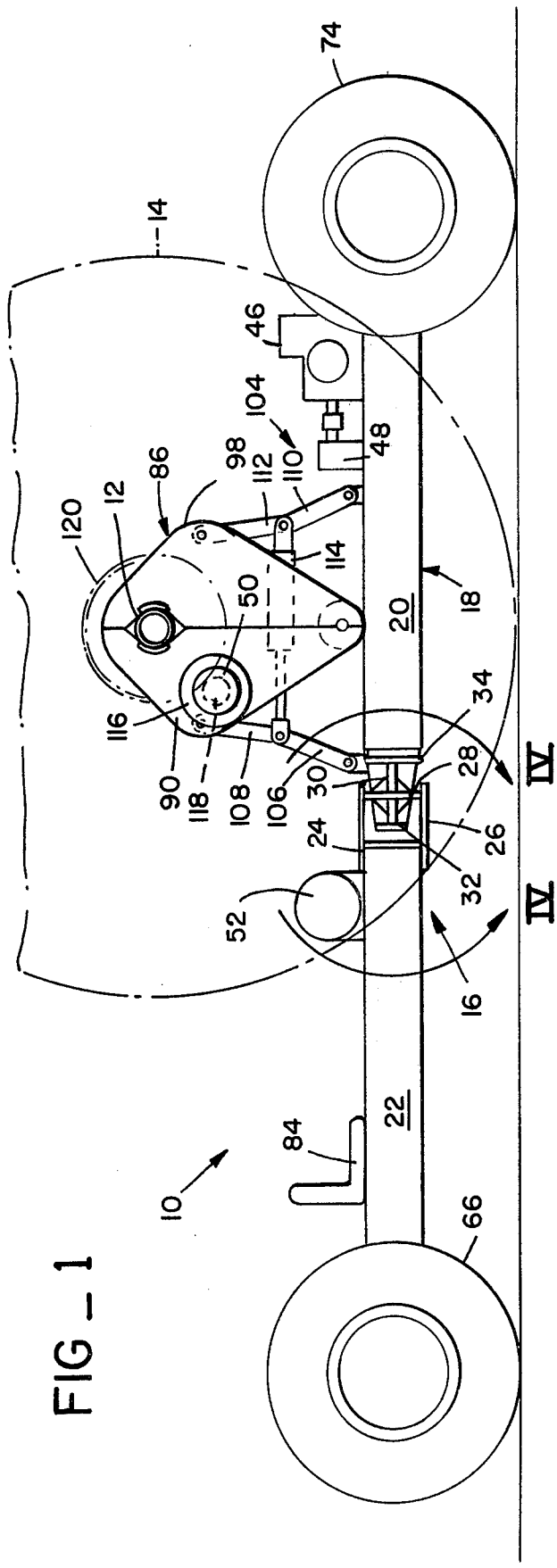
FIG_1
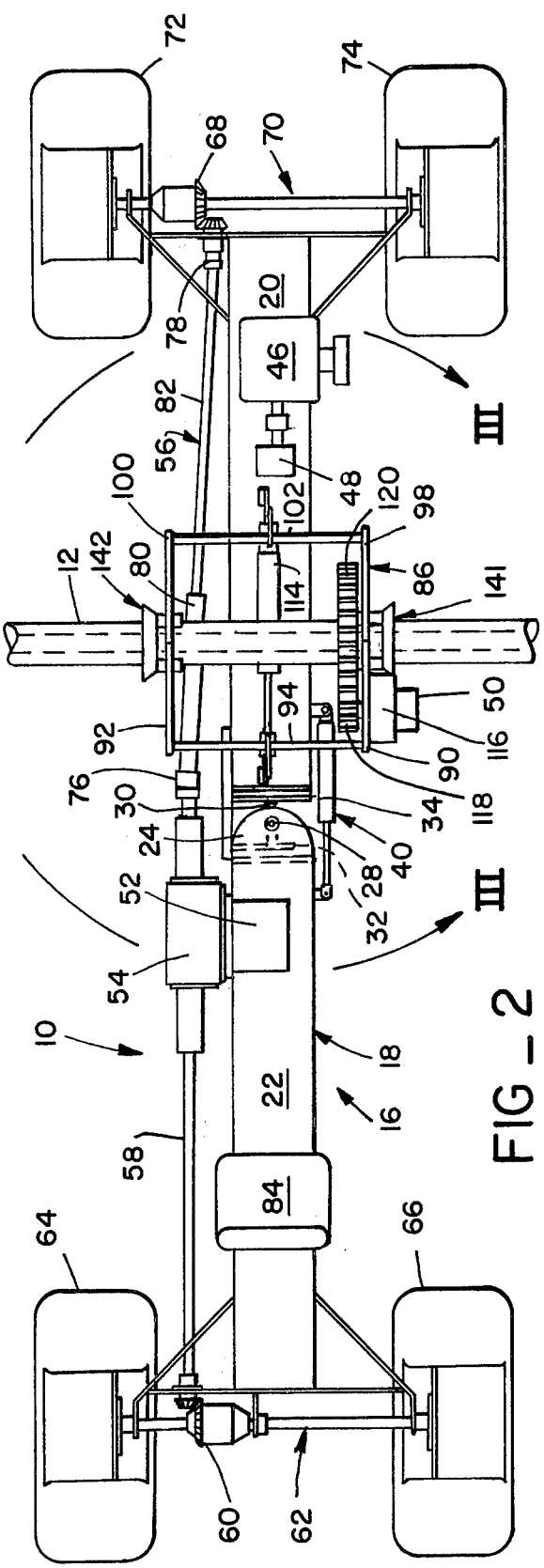
FIG_2

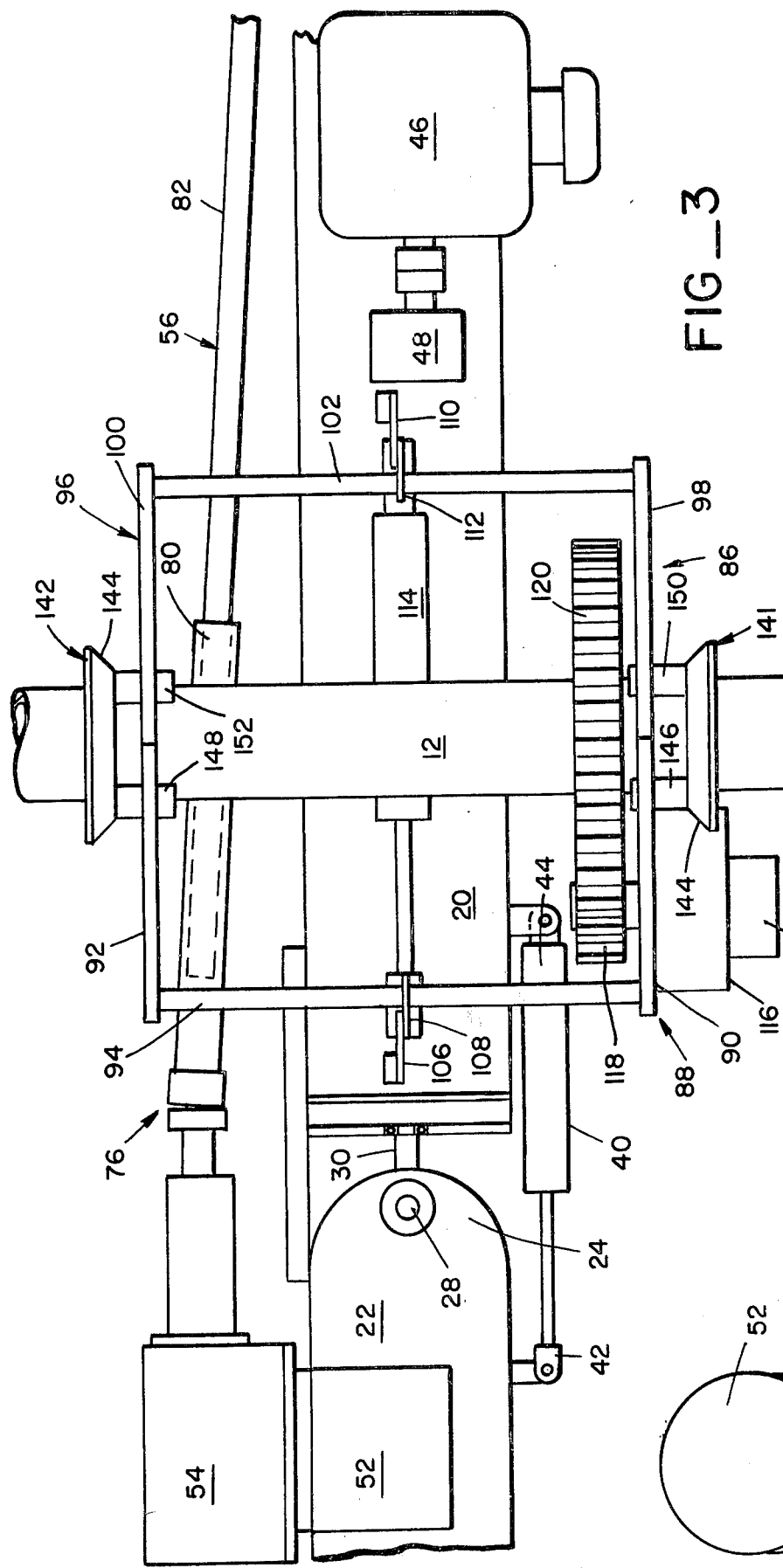

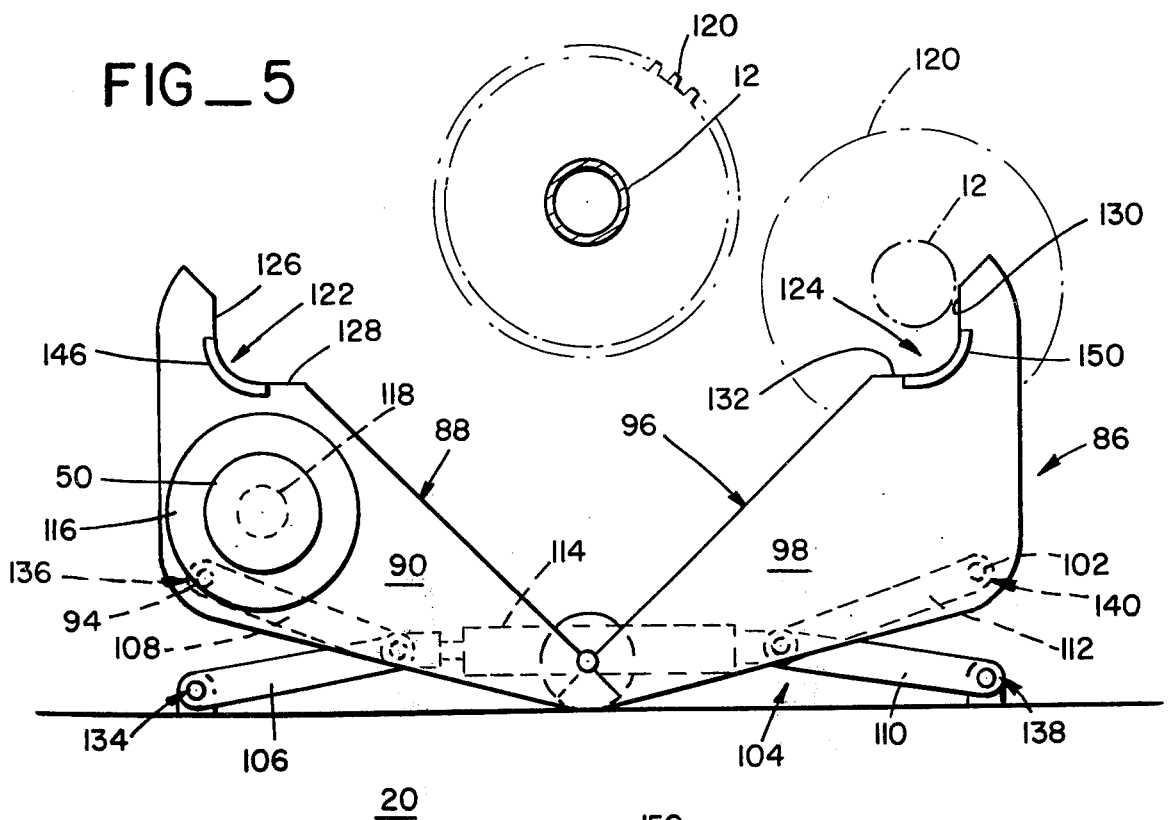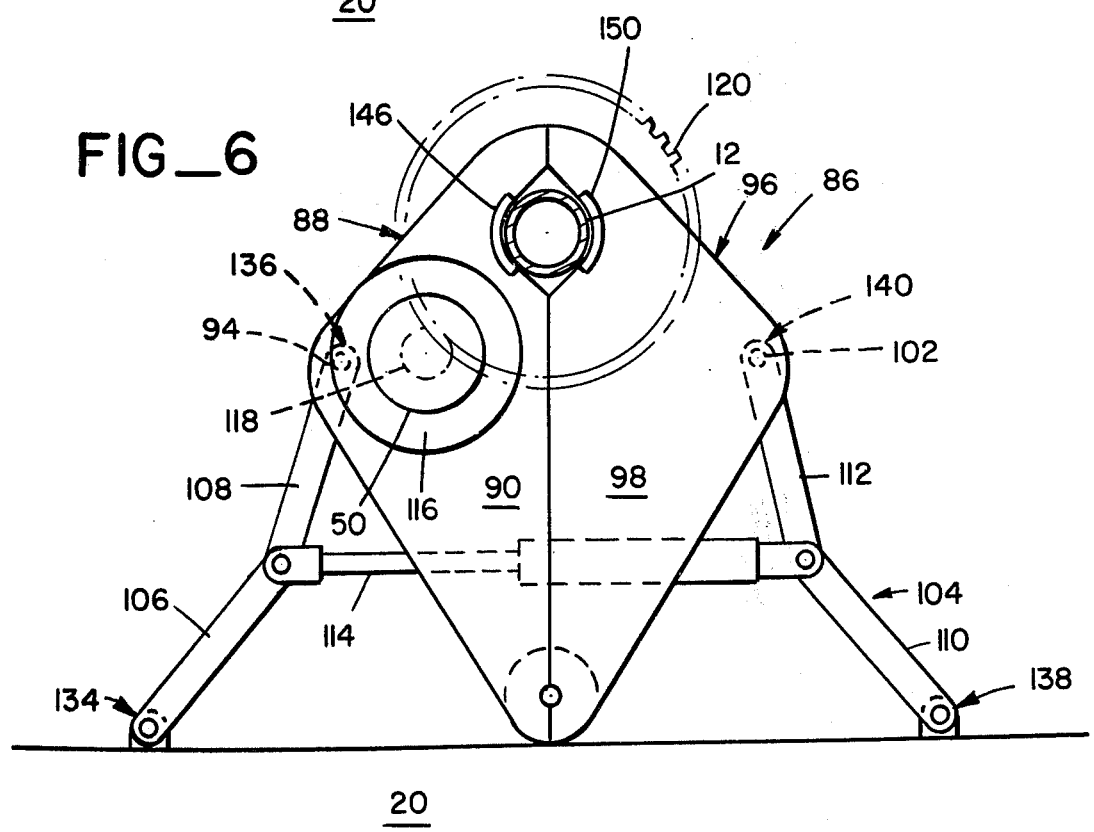

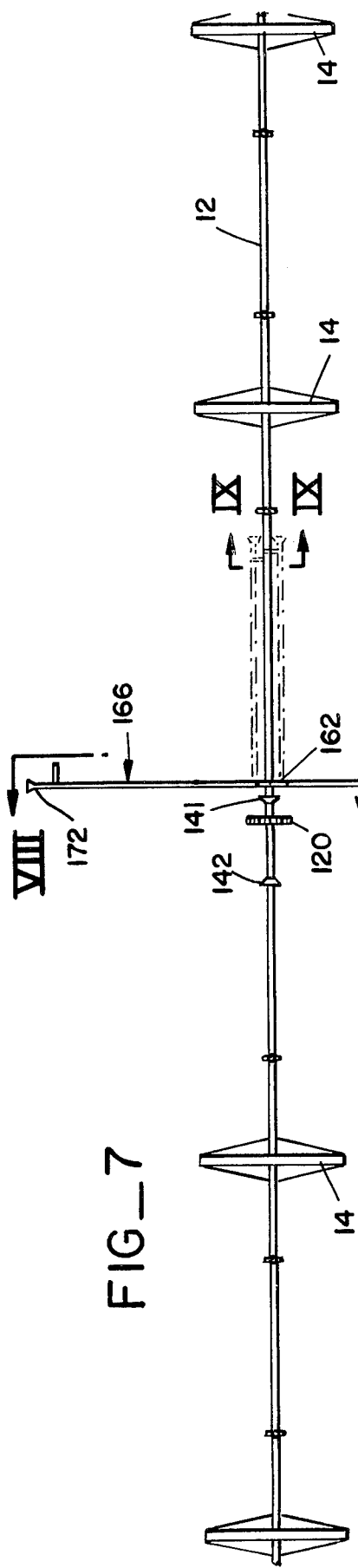
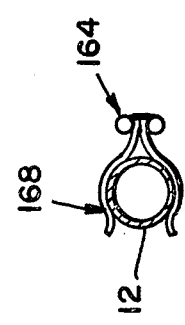
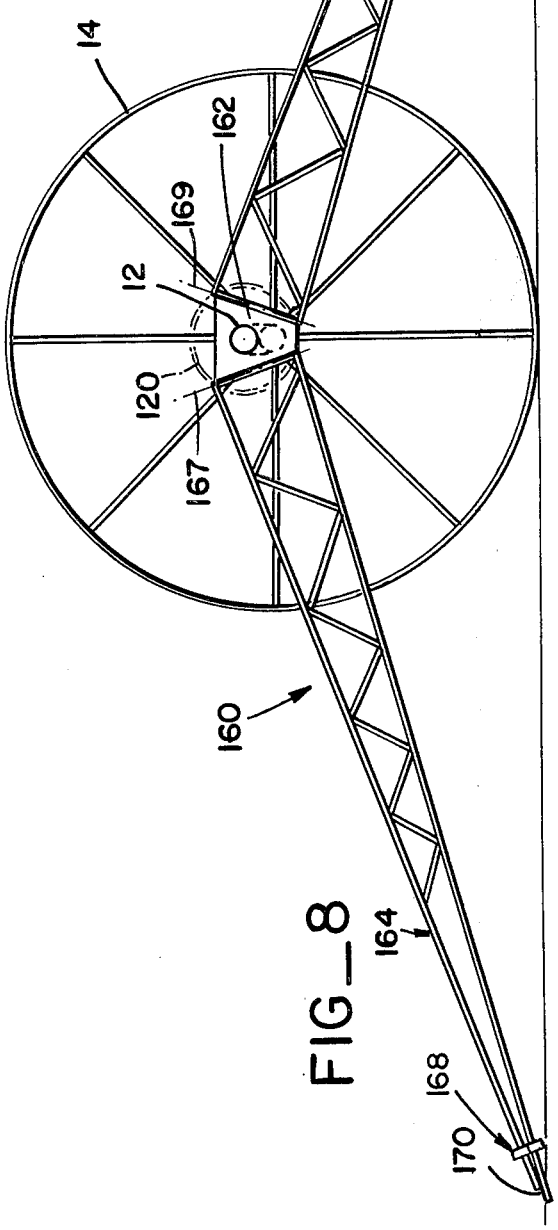

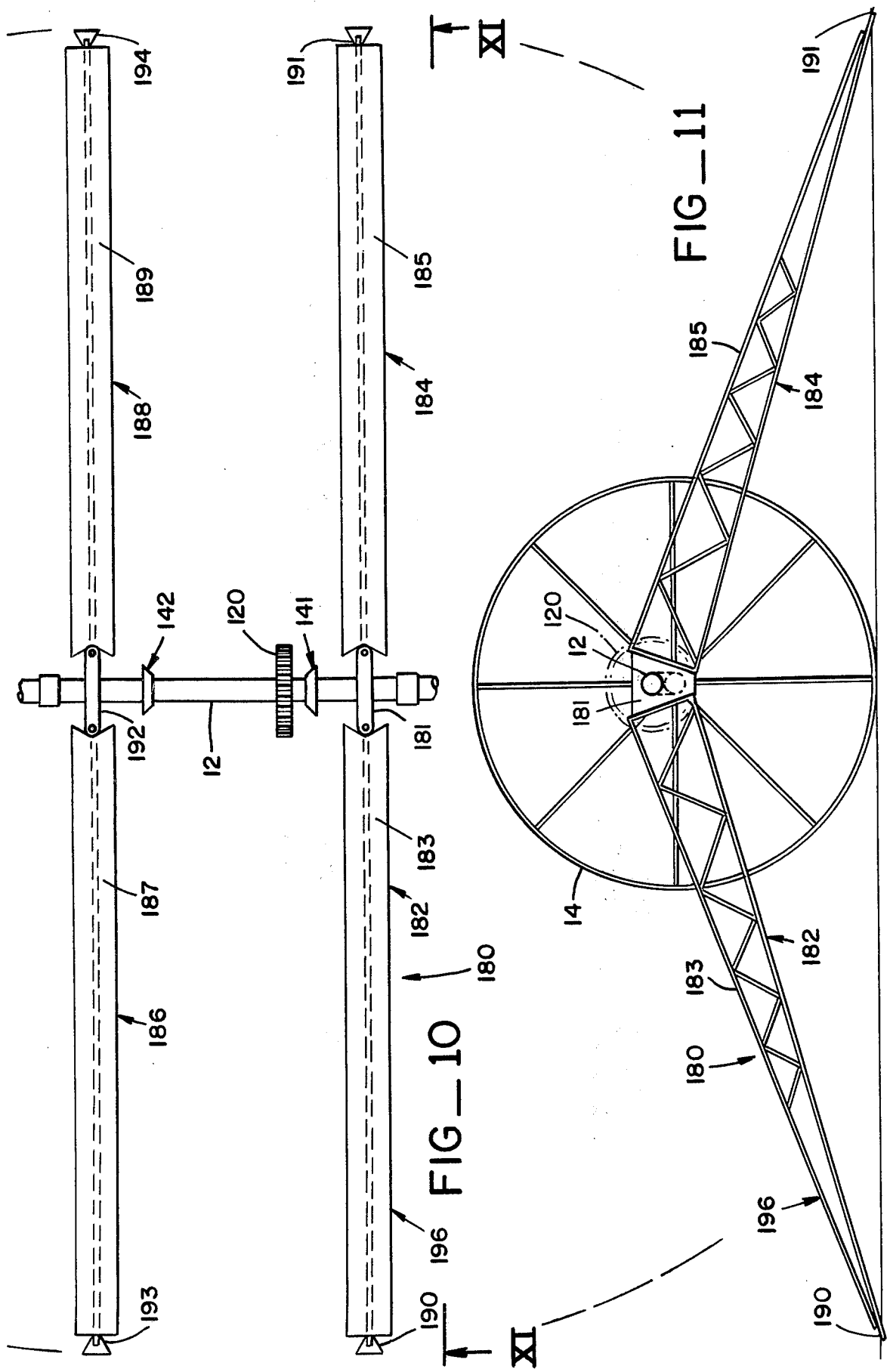

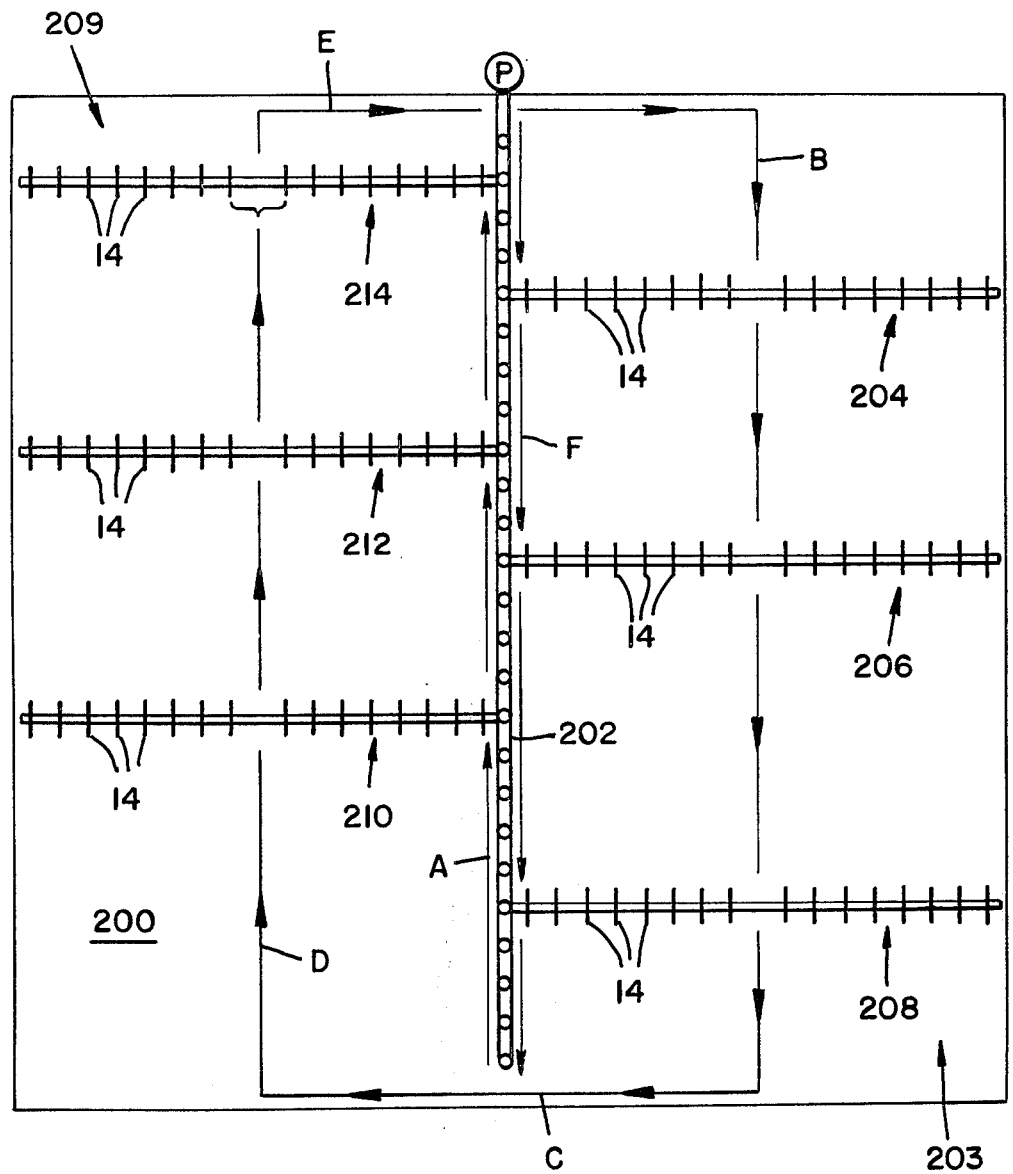
FIG_12

METHOD AND APPARATUS FOR TRANSPORTING AN IRRIGATION LINE

BACKGROUND OF THE INVENTION

This invention relates to irrigation apparatus, and more particularly, to a mobile unit which may be transported from irrigation line to irrigation line to successively move such irrigation lines.

In U.S. Pat. No. 3,872,943 entitled "Drive Unit", assigned to the assignee of this invention, a drive unit is disclosed for rotating a wheel-supported irrigation line about its longitudinal axis to in turn transport the irrigation line across a field. While such a mover unit has proven extremely effective in operation, it is to be understood that such mover unit is designed to remain connected to an irrigation line, i.e., such mover unit is not designed to be moved from irrigation line to irrigation line to move them in succession. Rather, each irrigation line by necessity has a mover unit fixed thereto for operation therewith.

In the normal operation of such assemblies of irrigation line and mover unit, a plurality of irrigation lines, each incorporating such a mover unit, are associated with and connected to a main line, and extend from such main line on either side thereof. Under normal conditons, each irrigation line might be, for example, a quarter of a mile long, with the mover unit disposed substantially at the midpoint thereof. If such operation, each irrigation line is set in place for, for example, twelve hours, and water passes through such main line and irrigation lines to irrigate a field. The irrigation lines are then drained of water, and each irrigation line is disconnected from the main line. Each irrigation line is then transported a certain distance, i.e., for example, 60 feet by means of rotation thereof through the mover unit associated therewith, and is reconnected to the main line. It has been found that the actual time of operation of each mover unit in the transporting of such irrigation line 60 feet is but a few minutes. It has also been found that the cost of the mover unit may be approximately one third the overall cost of the combined irrigation line and mover unit. And, as set forth above, for each 12 hour operating sequence of a combined mover unit and irrigation line, such mover unit is being used for only a few minutes.

U.S. Pat. No. 3,800,820 to Trunnell discloses an irrigation pipe mover generally similar to the above-described system. That is, a mover is associated with a pipe to transport such pipe, with the mover remaining in place with such pipe even when such pipe is not being transported. Thus, it is again clear that, in the system of U.S. Pat. No. 3,800,820, each irrigation line would require such a mover for movement thereof.

In another known system, a tractor includes a rotatably drivable flange associated therewith, which may be driven by the power source of the tractor. Such tractor may be driven to the end of an irrigation line, and such flange may be bolted to the end of the irrigation line. Upon rotation of the flange and driving of the tractor, rotational torque is applied to the irrigation line to rotate it and thereby transport it over the field. Such system has proven somewhat problematical since, with a relatively long irrigation line, i.e., for example, a quarter of a mile, the opposite end of the irrigation line would not start to turn until a certain amount of twisting takes place in the line. Such opposite end of the line has been found to fall behind the end of the line associated with the tractor, and it has been found that under certain operating conditions, such opposite end of the line could fall substantially behind the end of the irrigation line associated with the tractor. In any case, it has been found that it is extremely difficult to maintain such irrigation line in a substantially straight condition.

U.S. Pat. No. 2,946,515 to Jensen and U.S. Pat. No. 3,147,746 to Jensen each disclose a system wherein a motor is positioned outwardly at the end of an irrigation line to apply rotational torque to an elongated shaft running substantially the full length of the irrigation line. It will be seen that such a system is relatively complicated, as there is no relatively direct connection between the motor and the irrigation line for efficiently applying rotational torque thereto.

Of more general interest in this area, are U.S. Pat. No. 3,561,615 to Forsberg et al., disclosing apparatus for gripping a pipe to impart axial movement thereto, U.S. Pat. No. 3,756,426 to Young, which discloses a unit capable of carrying a pipe thereon for the transport of such pipe, and U.S. Pat. No. 3,103,939 to Haugland, disclosing apparatus for pivoting a shaft about its longitudinal axis.

SUMMARY OF THE INVENTION

It is accordingly an object of this invention to provide apparatus for transporting an irrigation line including a transport assembly which may be connected to an irrigation line to move such irrigation line, be disconnected therefrom, and be in turn moved to another irrigation line to in turn move such irrigation line when desired.

It is a further object of this invention to provide apparatus for transporting an irrigation line including a transport assembly, and means for insuring that such transport assembly is effectively connected to such irrigation line for movement thereof, and which may efficiently be disconnected therefrom to be moved to another irrigation line.

It is a still further object of this invention to provide apparatus for transporting an irrigation line including a transport assembly, wherein such apparatus is capable of applying rotational torque to such irrigation line at an area between the ends of that irrigation line.

It is a still further object of this invention to provide apparatus for transporting an irrigation line which, while fulfilling the above objects, is extremely efficient in design and use.

It is a still further object of this invention to provide apparatus for insuring the stability of an irrigation line when the transport assembly has been removed therefrom.

It is a still further object of this invention to provide apparatus for transporting an irrigation line including a transport assembly which can be conveniently moved from one irrigation line to another without the necessity of moving such transport assembly around the ends of irrigation lines, and without the necessity of breaking irrigation lines.

It is a still further object of this invention to provide a method of transporting irrigation lines in a highly efficient manner.

Broadly stated, the apparatus is for transporting an irrigation line supported by and having fixed relative thereto a plurality of wheel means and transportable upon rotation thereof about the longitudinal axis thereof. Such apparatus comprises a transport assembly movable to adjacent an irrigation line inwardly of a wheel means most adjacent an end of the irrigation line, means associated with the transport assembly for selectively applying rotational torque to an irrigation line at an area inwardly of a wheel means most adjacent an end of that irrigation line, with the transport assembly adjacent the irrigation line to rotate the adjacent irrigation line about the longitudinal axis thereof, and means associated with the transport assembly for allowing removal of the transport assembly from a transported irrigation line.

Broadly stated, the invention also comprises a method of transporting an irrigation line supported by and having fixed relative thereto a plurality of wheels, comprising applying rotational torque to the irrigation line at an area thereof between an adjacent pair of wheels, to rotate the irrigation line about its longitudinal axis.

BRIEF DESCRIPTION OF THE DRAWINGS

These and other objects of the invention will become apparent from a study of the following specification and drawings, in which:

FIG. 1 is a side elevational view of the inventive apparatus for transporting an irrigation line;

FIG. 2 is a plan view of the apparatus shown in FIG. 1;

FIG. 3 is an enlarged plan view of the portion III—III of FIG. 2;

FIG. 4 is an enlarged side elevation of the portion IV—IV shown in FIG. 1;

FIG. 5 is a side elevation of the clamp arm means of the apparatus, shown with the individual first and second arm means portions in their open positions;

FIG. 6 is a view similar to that shown in FIG. 5, with the individual first and second arm means portions in their closed positions;

FIG. 7 is a plan view of a wheeled irrigation line having brace means associated therewith;

FIG. 8 is a view taken along the line VIII—VIII of FIG. 7;

FIG. 9 is a sectional view taken along the line IX—IX of FIG. 7;

FIG. 10 is a plan view similar to that shown in FIG. 7, but showing a second embodiment of brace means;

FIG. 11 is a view taken along the line XI—XI of FIG. 10; and

FIG. 12 is a schematic plan view showing an operative method of use of the apparatus.

DESCRIPTION OF THE PREFERRED EMBODIMENT

Shown in FIGS. 1 and 2 is apparatus 10 for transporting an irrigation line 12. Such irrigation line 12 is of the well-known type, having a plurality of sprinklers disposed along the length thereof, and being supported by a plurality of wheels 14, such wheels 14 being secured to the irrigation line 12 at spaced intervals along its length. Such wheels 14 may be normally spaced approximately 40 feet apart along the length of such irrigation line 12, but with the wheel 14 which would normally be the middle wheel along the irrigation line being left out, so that at the midportion of the irrigation line 12 there is a distance of approximately 80 feet between the two wheels most adjacent the mid-point of the irrigation line 12 (see FIG. 7).

The apparatus 10 for transporting such line 12 includes a transport assembly 16. Such transport assembly 16 is made up of frame means 18, which in turn comprise a first, or forward frame portion 20, and a second, or rearward frame portion 22. The rearward frame portion 22 has fixed thereto as a portion thereof spaced, substantially horizontally disposed brackets 24,26, and a substantially vertical shaft 28 extends between such brackets 24,26 and has its ends pivotally associated with such brackets 24,26 so as to be pivotable about its longitudinal axis relative to the frame portion 22. A substantially horizontally disposed shaft 30 is fixed to the shaft 28 adjacent the mid-point thereof, such substantially horizontal shaft 30 extending between a pair of vertical brackets 32,34 fixed to the frame portion 20 as a part thereof, the ends of the substantially horizontal shaft 30 being pivotally mounted to the respective brackets 32,34 associated therewith, so that such assembly made up of shaft 28 and shaft 30 is pivotally mounted relative to the frame portion 20 so as to be pivotable about the longitudinal axis of the shaft 30. It is to be seen that through such structure, the frame portions 20,22 are relatively pivotable about a substantially vertical axis 36 defined by the longitudinal axis of the shaft 28, and are also pivotable relative to each other about a substantially horizontal axis 38 disposed longitudinally of the transport assembly 16, and defined by the longitudinal axis of the shaft 30 (see FIG. 4). An extendable and retractable cylinder 40 has the rod end 42 pivotally secured relative to the frame portion 22, and the head end 44 pivotally secured relative to the frame portion 20, so as to provide for pivoting of one frame portion relative to the other frame portion about the substantially vertical axis 36 defined by the shaft 28 in accordance with the description which will follow.

The frame portion 20 has mounted thereto an engine 46 which may be of well-known type, and such engine 46 in turn is drivingly connected to a hydraulic pump 48. Such pump 48 operatively supplies hydraulic pressure to a hydrostatic motor 50, the operation of which will be described in detail. Such pressure is supplied through the motor 50 to another hydrostatic motor 52 connected in series with such motor 50, and this motor 52 drives through a transfer case 54 forward and rearward drive shafts 56,58. The rearward shaft 58 is connected to a differential 60 to drive a rear axle 62, to which wheels 64,66 are in turn mounted. The forward drive shaft 56 extends from the transfer case 54 to a forward differential 68 which in turn drives an axle 70 having wheels 72,74 mounted thereto. The forward drive shaft 56 includes along its length two universal joints 76,78, and the body of the shaft 56 is made up of two portions 80,82 of tubing of square cross-section, one slidably disposed inside the other, and through such universal joints and telescoping motion of the drive shaft 56, it will be seen that one frame portion may be pivoted relative to the other frame portion about the substantially vertical axis 36 defined by the shaft 28, through extension and retraction of the hydraulic cylinder 40. Through such extension and retraction of the cylinder 40, it will be seen that the transport assembly 16 may be steered by the operator thereof as such transport assembly 16 is driven over the field, the operation being seated on the seat 84 fixed to the frame portion 22.

The pivoting of one frame portion relative to the other frame portion about the axis 38 defined by the shaft 30 allows for unevenness which may exist in the field being irrigated. That is, without such pivoting being allowed about such horizontal pivot axis 38, it is possible that one wheel of the transport assembly 16 could be lifted from the ground so that traction would be lost through the associated differential mechanism.

Through the drive means and the steering means described above, it will be seen that the transport assembly 16 is a highly mobile unit which may be moved to substantially any location desired in a field to be irrigated.

As best shown in FIGS. 3, 5 and 6, the frame means 18 has arm means 86 pivotally secured thereto. Such arm means 86 are disposed adjacent the mid-point of the transport assembly 16, and are made up of first arm means portion 88 made up of spaced arms 90,92 pivotally fixed to the frame portion 20, and being rigidly interconnected by a bar 94 extending between such arms 90,92. The arm means 86 are further made up of a second arm means portion 96 made up of a pair of spaced arms 98,100 pivotally secured to the frame portion 20, and rigidly interconnected by a bar 102 extending between such arms 98,100. The arms 90,91,98,100 are pivotable relative to the frame portion 20 about a common axis disposed transversely of the frame portion 20. Associated with the arms 90,92,98,100 are linkage means 104 best shown in FIGS. 5 and 6. A link member 106 has one end pivotally fixed to the frame portion 20, and the opposite end pivotally fixed to a second link member 108 which in turn has its opposite end pivotally fixed to the bar 94 and relative to the arms 90,92. Likewise, a link member 110 has one end pivotally fixed to the frame portion 20 and the other end pivotally fixed to an end of a link member 112 which in turn has its opposite end pivotally fixed to the bar 102, and relative to the arms 98,100. A hydraulic cylinder 114 has its rod end pivotally connected to the link members 106,108 at the interconnection of such link members 106,108, and its head end pivotally connected to the link members 110,112 at the pivotal interconnection of such link members 110,112. With the cylinder 114 in its fully retracted state, as shown in FIG. 5, it will be seen that the axes of pivotal association of the link members 106,108 and 110,112 are drawn inward by the cylinder 114, and each link member is disposed generally horizontally relative to the frame means 18. Extension of the cylinder 114 moves the associated ends of the link members 106,108,110,112 outward to in turn pivot the arms 90,92,98,100 and thereby the first and second arm means 88,96 from their outward or open positions to their inward or closed positions as shown in FIG. 6.

The motor 50 is mounted to the arm 90 for movement therewith, and such motor 50 is connected to a reducer 116 to in turn drive a drive gear 118 rotatably mounted to such arm 90. The motor 50, it will be understood, may be selectively driven by the operator of the transport apparatus 16 through suitable controls.

In using the device, it is to be noted that with the cylinder 14 retracted to move the arms 90,92,98,100 to their outward positions, the highest point of the assembly is the uppermost ends of such arms 90,92,98,100, the heights of which are such that the entire apparatus may be passed beneath the irrigation line 12.

In using such apparatus, the irrigation line 12 is provided with an output bull gear 120 fixed thereto generally at its mid-point, and generally midway between the adjacent pair of wheels 14 disposed near the center of the irrigation line, i.e., between those wheels 14 spaced approximately 80 feet apart. The transport assembly 16 is positioned adjacent the irrigation line 12 by the operator so that the arms 90,92,98,100 are positioned relative to the irrigation line 12 as best shown in FIG. 5, i.e., with the irrigation line 12 substantially directly over the pivot axis of the arms 90,92,98,100. The transport assembly 16 is then stopped, and the hydraulic cylinder 114 is extended to utilize the linkage means 104 to move the arms 90,92,98,100 to their inward positions. The arms 90,92,98,100 define respective recessed areas, i.e., for arms 90,92 shown at 122,124 in FIG. 5, which cooperate to provide that the arms 90,92,98,100 surround the irrigation line, to secure the irrigation line 12 therebetween. The arms 90,92,98,100 define camming surfaces, i.e., for arms 90,98 shown at 126,128,130,132 in FIG. 5, as portions of the recessed areas thereof, so that if the elevation of the irrigation line at such point is not exactly as it should be in relation to the elevation of the transport assembly 16 due to, for example, unevenness in terrain, appropriate ones of such camming surfaces will contact the irrigation line 12 as for example shown in phantom in FIG. 5, showing the relative positions of such a camming surface 130 and irrigation line 12, to force or urge the irrigation line 12 to seat into the full depth of the recessed areas upon such movement of the arms 90,92,98,100 to their inward positions. Through such camming means, the irrigation line 12 is properly positioned relative to the arm means 86.

Additionally, upon movement of the arms 90,92,98,100 to their inward positions, the drive gear 118 is carried with arm 90 to be brought into engagement with the output bull gear 120 fixed to the irrigation line 12. It will be understood that proper positioning of the drive gear 118 a chosen distance from the longitudinal axis of the irrigation line 12 is extremely important, so that the teeth of the drive gear 118 can be brought into proper engagement with the teeth of the bull gear 120. This proper positioning is insured by the camming surfaces described above, which force the irrigation line 12 and output bull gear 120 thereon into proper position relative to the closed arm means 86, and thus relative to the drive gear 118 mounted to the arm 90.

Because of the substantially horizontal positioning of the link members 106,108,110,112 with the hydraulic cylinder 114 fully retracted as described above and as shown in FIG. 5, it will be understood that for a given initial extending movement of the cylinder 114, the distance between pivot 134 and pivot 136, and also between pivot 138 and pivot 140, increases relatively rapidly to move the arms 90,92,98,100 from their outward positions at a relatively rapid rate. Toward the end of the travel of such arms 90,92, 98,100 to their inward positions, the link members 106,108 are relatively more aligned, as are the link members 110,112, and are disposed more vertically, so that it will be seen that for a given amount of extending movement of the cylinder 114 when in its substantially extended state, the distance between between the pivot 134 and the pivot 136, and also the distance between the pivot 138 and the pivot 140, do not increase at the initial high rate described above, but rather, the linkage means 104 because of such positioning provide an increasing mechanical force advantage for moving the arms 90,92,98,100 as they approach the inward positions thereof. Such increasing mechanical force advantage further aids in providing sufficient force to insure that the camming surfaces operate in a proper manner to urge the irrigation line 12 into proper seating with the recessed areas.

It is also to be understood that the drive gear 118 must be aligned relative to the output bull gear 120 fixed to the irrigation line 12, as measured along the longitudinal axis of the irrigation line 12. For aiding in this purpose, the irrigation line 12 has fixed thereto a pair of spaced-apart guide members 141,142, each guide member defining an annular conically-shaped surface 144 (FIG. 3) tapered inwardly in the direction of the other guide member.

When the operator is using such transport assembly 16, such operator attempts to position the drive gear 118 relative to the output bull gear 120 so that they are so properly aligned. However, in furtherance of achieving such alignment, the arms 90,92,98,100 have fixed thereto as portions thereof respective pad members 146,148,150,152 which in fact define respective portions of the recessed areas of such arms 90,92, 98,100. Upon movement of the arms to their inward positions, if the drive gear 118 is not in fact in proper alignment with the output bull gear 120 when measured along the longitudinal axis of the irrigation line 12, the conically-shaped surface 144 of one or the other guide member 141,142 will be contacted by the associated pad members to tend to urge the transport assembly 16 along the longitudinal axis of the irrigation line 12 and relative to such irrigation line 12, tending to urge the drive gear 118 into proper alignment with the output bull gear 120. The force advantage described above aids in such urging. The operator of the transport assembly 16 will be aware of such urging, and will actuate the cylinder 40 to tend to pivot one frame portion relative to the other frame portion. It is to be noted that the substantially vertical pivot axis 36 defined by shaft 28 is positioned generally adjacent the mid-point of the transport assembly 16, near the arm means 86. The actuation of the cylinder 40, with the wheels 64,66,72,74 in their non-driving states, actually shifts the midportion of the transport assembly 16 laterally relative to the irrigation line 12, the frame portion 20 pivoting generally about a substantially vertical axis disposed midway between the wheels 72,74, and the frame portion 22 pivoting generally about a substantially vertical axis disposed midway between the wheels 64,66. Through the actuation of such cylinder 40, it is thereby insured that the drive gear 118 can be properly positioned along the irrigation line 12 for proper alignment with the output bull gear 120.

It will then be seen that the operator may selectively actuate motor 50 to drive the drive gear 118, to in turn apply rotational torque to the irrigation line 12 through the output bull gear 120, to rotate the irrigation line 12 about the longitudinal axis thereof. The recessed areas, i.e., as at 122,124 are sized so as to define a gap between the arms 90,92, 98,100 and the irrigation line 12, to allow free rolling of such irrigation line 12 relative thereto, meanwhile with the arms 90,92,98,100 acting as clamp means which selectively define bearing means which locate the irrigation line 12 relative to the transport assembly 16. The operator also actuates the motor 52 to drive the wheels 64,66,72,74, and through such driving of the wheels and the application of rotational torque to the irrigation line 12, the irrigation line 12 may be transported over the field.

It is to be noted that the transport assembly 16 in the preferred embodiment applies such rotational torque to the irrigation line 12 at an area between the ends of that irrigation line 12, overcoming the problem of windup or excessive twisting of the irrigation line 12 described above. The application of such rotational torque with advantage takes place at an area generally midway between the ends of the irrigation line 12, such application actually occurring generally midway between the centermost wheels 14, to minimize any windup effect, and to most efficiently transfer torque to the irrigation line 12 for the transportation thereof. Also, as set forth above, the area to which rotational torque is applied to the irrigation line 12 is positioned between the adjacent pair of irrigation line wheels 14 closest to the mid-point of the irrigation line 12, and of course inwardly of the outermost wheels 14, i.e., those wheels 14 most adjacent the ends of the irrigation line 12.

It has been found important that the speed of the transport assembly 12 determined by the speed of the wheels 644,66,72,74 be controlled in relation to the speed of the irrigation line 12 due to the application of rotational torque thereto. This has been found not to be so critical in the situation where the transport assembly 16 tends to move in advance of the extending ends of the irrigation line 12. However, if the situation is reversed and the ends of the irrigation line 12 tend to travel faster than the traveling speed of the transport assembly 16, the ends of the irrigation line 12 tend to travel inward relative to the transport assembly 16, placing the irrigation line 12 in compression. As such an irrigation line 12 is relatively light in weight, compression applied to the irrigation line 12 in an area of a wheel 14 might tend to force the wheel 14 backward or forward relative to the transport assembly 16, resulting in relatively severe alignment problems of the line 12. For this reason, the motor 50 is chosen as a variable speed motor, the rotational speed of which may be varied relative to the rotational speed of the motor 52. That is, the output speed of the motor 50 driving the gear 118 may be varied through, for example, well-known valve means and circuitry, in relation to the output speed of the motor 52 which drives the transport assembly 16.

Through such means, the speed of the transport of the irrigation line 12 through rotation thereof may be selectively varied relative to the speed of the transport assembly 16, to obviate the above-described problem.

As set forth above, the wheels 14 fixed to the irrigation line 12 support such irrigation line 12 a distance above the ground. After the irrigation line 12 has been moved to a chosen place, the arms 90,92,98,100 are moved to their outward positions, wherein the uppermost ends thereof are sufficiently low to allow the transport assembly 16 and structure associated therewith to pass beneath such irrigation line 12. The operator may thereby drive such transport assembly 16 under the raised irrigation line 12 to a position to operate on another irrigation line 12.

Each irrigation line with advantage has associated therewith brace means 160 which will now be described in detail.

As stated above, the distance between wheels 14 in the area of application of torque to an irrigation line 12 is approximately 80 feet, or generally twice the distance between any other adjacent pair of wheels 14 along such line 12. Substantially at the mid-point of such eighty foot distance, and generally midway between the ends of the line 12 are brace means 160 associated with such irrigation line. In such brace means 160, a flange 162 is fixed to such irrigation line 12, and such flange 162 has pivotally fixed thereto a pair of brace members 164,166, the brace members 164,166 being pivotable to respective inward positions relative to the irrigation line 12 to lie substantially therealong, each brace member having fixed thereto a spring clip assembly 168 as shown in FIG. 9. The spring clip assembly 168 of each brace member is sized and positioned to cooperate with the irrigation line 12 so that upon pivoting of each respective brace member inwardly to lie along the irrigation line 12, the end of such brace member is releasably held relative to the irrigation line 12. With the brace members 164,166 in such inward positions as shown in phantom in FIG. 7, it will be seen that the transport assembly 16 may be utilized to apply rotational torque through the output bull gear 120 to rotate the irrigation line 12, the brace members 164,166 rotating with the irrigation line 12 and remaining positioned relative thereto during movement of such irrigation line 12.

With the transport assembly 16 removed from the irrigation line 12 upon transportation thereof, it is to be understood that it is extremely important to stabilize the irrigation line 12 when the weight of the transport assembly 16 is not acting on such irrigation line 12. It has been found that, with the transport assembly 16 removed, and without proper stabilization, a relatively strong wind could move such irrigation line 12, or the line 12 could roll down a hill. In order to stabilize such irrigation line 12, the brace members 164,166 are pivotable to outward positions wherein the brace members 164,166 extend outwardly from the irrigation line 12 in generally opposite directions on either side of such irrigation line 12. The pivot axes 167,169 of the brace members 164,166 relative to the irrigation line 12 are angled so that the respective extended ends 170,172 defined by the brace members 164,166 are positioned adjacent the ground on which the irrigation line 12 is disposed with such brace members 164,166 in their respective outward positions. In fact, the pivot axes are so disposed to bring the extended ends 170,172 of the brace members 164,166 into engagement with the ground upon which the irrigation line 12 is disposed, with such brace members 164,166 in their outward positions.

The brace members 164,166 are sized and angled to contact the ground to hold the irrigation line 12 at a substantially proper height in the area of engagement of the transport assembly 16 and irrigation line 12, so as to allow for clearance thereunder to drive the transport assembly 16 under such irrigation line 12, as described above. Such brace members 164,166 also aid in holding that portion of the irrigation line 12 at the proper height to aid in the seating of such irrigation line 12 in the recessed areas of the arms 90,92,98,100. The brace members 164,166 also support a portion of the weight of the irrigation line 12 in the area substantially midway between the adjacent wheels 14 along the longest otherwise undersupported irrigation line span (i.e., 80 feet).

Shown in FIGS. 10 and 11 is another embodiment of brace means 180 associated with the irrigation line 12. Such brace means 180 are also situated substantially at the midpoint of the 80 foot span between adjacent wheels 14, and are positioned generally midway between the ends of the line 12. Such brace means 180 are made up of a brace member 182, a brace member 184, a brace member 186, and a brace member 188.

The brace members 182,184 are pivotally fixed to a flange 181 which is in turn fixed to the line 12, and the brace members 186,188 are pivotally fixed to a flange 192 which is also fixed to the line 12. The brace members 182,184,186,188 are pivotable to respective inward positions relative to the irrigation line 12 to lie substantially therealong and each brace member may have fixed thereto a spring clip assembly, similar to the previous embodiment, which is sized and positioned to cooperate with the irrigation line 12 upon pivoting of each respective brace member inwardly to lie along the irrigation line 12, so that the end of such brace member is releasably held relative to the irrigation line 12.

With the transport assembly 16 removed from the irrigation line 12 upon transportation thereof, the brace members 182,186 may be pivoted to outward positions wherein the brace member 182 and brace member 186 extend outwardly in generally the same direction from the irrigation line 12, and the brace members 184,188 may be pivoted to outward positions to extend in directions generally opposite the extending directions of the brace members 182,186 respectively. The pivot axes of the brace members 182,184,186, 188 relative to the irrigation line 12 are angled so that the respective extended ends 190,191,193,194 defined by the brace members 182,184,186,188 are positioned adjacent the ground on which the irrigation line 12 is disposed with such brace members in their outward positions, similar to the previous embodiment. Such brace members 182,184,186,188, also similar to the previous embodiment, stabilize the irrigation line 12 with the weight of the transport assembly 16 removed from such irrigation line 12, and act to hold the irrigation line 12 at a substantially proper height in the area of engagement of the transport assembly 16 and irrigation line 12. However, in the present embodiment, the brace members 182,184,186,188 together act as ramp means 196 made up of ramp portions 183,185,187,189, each fixed to and acting as part of a respective brace member. The brace members 182,184,186,188 are fixed along the line 12 in positions so that, with such brace members 182,184,186,188 pivoted to their outward positions as shown in FIG. 10, the ramp portions 183,187, and the ramp portions 185,189, are respectively spaced apart to substantially conform to the spacing between the wheel 64 and wheel 66, and also the wheel 72 and wheel 74 of the transport assembly 16. It will be seen that ramp means 196 provide that the transport assembly 16 may be driven up to the extended ends of, for example, the brace members 182,186, may be driven up the ramp portions 183,187, over the irrigation line 12, and down the ramp portions 185,189 to the other side of the irrigation line 12.

Reference is made to FIG. 12 for the disclosure of a preferred method of use of such apparatus as described above.

FIG. 12 shows a field 200 wherein is positioned an elongated main line 202 having a plurality 203 of irrigation lines 204,206,208 extending from one side thereof, and a plurality 209 of irrigation lines 210,212,214 extending from the other side thereof, with each irrigation line being connectable to and disconnectable from the main line 202 and with each irrigation line having sprinkler means associated therewith, through which water travels to irrigate associated therewith, through which water travels to irrigate the field 200. Each irrigation line is supported by a plurality of wheels 14 fixed thereto, so that upon disconnection of any irrigation line from the main line 202, such irrigation line may be transported by applying rotational torque thereto by means of the assembly described above. The individual irrigation lines and wheels associated therewith are not drawn to scale, so as to aid in the clarity thereof.

Initially, the operator drives the transport assembly 16 to a pump which supplies water to the main line 202, and shuts off such pump. The operator then drives along the main line 202 along the path A, in one direction along the main line 202, disconnecting each connected irrigation line from the main line 202, one after the other in a sequence determined by the order of irrigation lines reached by travel in such one direction along the main line 202. That is, the operator will in turn disconnect irrigation line 208, irrigation line 210, irrigation line 206, irrigation line 212, irrigation line 204 and irrigation line 214 in that order from the main line 202 when traveling along the path A. The operator then travels along the path B, transporting each of the plurality 203 of irrigation lines in a direction opposite the one direction, each of the plurality 203 of irrigation lines being transported by the transport assembly 16 one after the other in a sequence determined by the order that such plurality of irrigation lines is reached by travel in such direction opposite in the one direction. That is, the operator will in turn transport irrigation line 204, irrigation line 206, and irrigation line 208. The operator, after transporting such irrigation lines 204,206,208, follows the path C, to the opposite side of the main line 202, and adjacent the plurality 209 of irrigation lines. The operator then transports each of this plurality 209 of irrigation lines in such one direction, each of such plurality 209 of irrigation lines being transported one after the other by the transport assembly 16 in a sequence determined by the order of such plurality of irrigation lines reached by travel in such one direction along the path D. That is, the operator transports in order irrigation line 210, then irrigation line 212, then irrigation line 214, as he meets them when traveling along the path D. The operator then drives along the path E to the end of the main line 202, and drives along the main line 202 along the path F, connecting each irrigation line to the main line 202, one after the other in a sequence determined by the order of irrigation lines reached by travel in the direction along the main line 202 opposite to that direction originally traveled along path A. That is, irrigation lines 214,204,212,206,210 and 208 are connected in succession to the main line 202. It will be understood that in the preferred method, each irrigation line is, of course, transported by applying rotational torque thereto at an area thereof between the adjacent central pair of wheels, such area being generally midway between the ends of the irrigation line being transported. Through the structure described above, it will be seen that in one embodiment the transport assembly 16 may be easily driven under one irrigation line after it has been moved to the next irrigation line to be transported. And, in the other embodiment, the ramp means disclosed allow the transport assembly 16 to be driven over the irrigation line and then down again onto the field 200. In either embodiment, it will be seen that the transport assembly 16 need not be driven around the ends of an irrigation line, and that the irrigation line need not be broken along its length to allow passage of the transport assembly 16 therepast.

In the prior art system described above, wherein each irrigation line has operatively fixed thereto a mover unit, the operation of disconnecting each line from the main line, moving each irrigation line, and reconnecting each irrigation line to the main line would, for example, take approximately three hours, assuming that the field is 160 acres and that six irrigation lines are used.

In the present system, it is estimated that the entire operation, in accordance with the method disclosed above, could be undertaken in approximately 45 minutes or less, again using six irrigation lines in a 160 acre field. It must be remembered that, in addition to such extremely efficient method of use, only a single mover unit is needed in the present system. Thus, the labor costs involved are substantially less in the present invention, and the apparatus costs are substantially lower than in the previous system. It will be understood that the differences in cost are even greater if the field to be irrigated is larger, i.e., for example 480 acres. This is so because the efficient method disclosed above will be relatively even more time-saving, and the transport of such irrigation lines still requires only a single transport assembly in accordance with the present specification.

What is claimed is:

1. Apparatus for transporting an irrigation line supported by and having fixed relative thereto a plurality of wheel means and transportable upon rotation thereof about the longitudinal axis thereof comprising:
   a transport assembly movable to adjacent a continuous irrigation line inwardly of a wheel means most adjacent an end of an irrigation line;
   readily attachable means associated with said transport assembly for selectively applying rotational torque to a continuous irrigation line at an area inwardly of a wheel means most adjacent an end of that irrigation line, with the transport assembly adjacent the irrigation line, to rotate the adjacent irrigation line about the longitudinal axis thereof; and
   means associated with the transport assembly for allowing removal of the transport assembly from a transported irrigation line.

2. The apparatus of claim 1 wherein the means associated with the transport assembly for selectively applying rotational torque to an irrigation line comprise means for applying said rotational torque at an area of an irrigation line generally midway between the ends thereof.

3. The apparatus of claim 1 further comprising means associated with said transport assembly for selectively applying rotational torque to an irrigation line at an area of an irrigation line generally midway between an adjacent pair of irrigation line wheel means.

4. The apparatus of claim 3 wherein the means associated with the transport assembly for selectively applying rotational torque to an irrigation line comprise means for applying said rotational torque at an area of an irrigation line generally midway between the ends thereof.

5. The apparatus of claim 1 wherein the means associated with said transport assembly for selectively applying rotational torque to an irrigation line comprise a first drive member interconnected with the transport assembly, motor means for selectively driving said first drive member, and a second drive member securable to an irrigation line, the first drive member being engagable with the second drive member to apply rotational torque from the first drive member to an irrigation line to which the second drive member is secured.

6. The apparatus of claim 5 wherein the first drive member comprises drive gear means, and wherein the second drive member comprises output gear means with which the drive gear means is directly engagable.

7. The apparatus of claim 6 wherein the motor means are associated with the transport assembly to move generally therewith.

8. The apparatus of claim 1 and further comprising clamp means operatively associated with the transport assembly, for selectively defining bearing means with which an irrigation line may be associated to locate an irrigation line relative to the transport assembly, meanwhile allowing rotation of an irrigation line about the longitudinal axis thereof upon application of rotational torque thereto.

9. The apparatus of claim 6 wherein the transport assembly comprises frame means, and further comprising arm means pivotably secured to the frame means, wherein the drive gear means are movable with the arm means upon pivoting thereof wherein, with the transport assembly adjacent an irrigation line, the arm means are pivotable to a first position to carry the drive gear means into engagement with the output gear means secured to an irrigation line, and to a second position moving the drive gear means from the output gear means to provide for disengagement thereof, and means for selectively pivoting said arm means to said first and second positions.

10. The apparatus of claim 9 further comprising means for positioning the drive gear means a chosen distance from the longitudinal axis of an irrigation line, to which said output gear means are secured.

11. The apparatus of claim 10 wherein the arm means comprise first and second arm means portions, pivotably mounted to the frame means, the first position of the arm means defining inward positions of the first and second arm means portions, the second position of the arm means defining outward positions of the first and second arm means portions, wherein the first and second arm means portions define respective recessed areas which cooperate to secure an irrigation line positioned therebetween with the first and second arm means portions in their inward positions, and wherein the drive gear means are rotatably mounted to the one arm means portion, wherein the first and second arm means portions further define camming surfaces as portions of the recessed areas thereof, for urging an irrigation line to seat in the recessed areas upon movement of the first and second arm means portions from their outward to their inward positions, to position an irrigation line relative to the drive gear means with the first and second arm means portions in their inward positions, so that the drive gear means are positioned a chosen distance from the longitudinal axis of a so-secured irrigation line.

12. The apparatus of claim 11 and further comprising a pair of guide members securable to an irrigation line, each defining a surface tapered inwardly in the direction of the other guide member, the tapered surfaces being contactable by the arm means to aid in aligning the drive gear means relative to the output gear means fixed to an irrigation line, along the longitudinal axis of the irrigation line.

13. The apparatus of claim 12 wherein said surface defined by each guide member is an annular conically shaped surface.

14. The apparatus of claim 12 wherein the means for selectively pivoting said arm means to said first and second positions comprise means for moving the arm means from the outward positions thereof to the inward positions thereof such that an increasing mechanical force advantage is provided as the first and second arm means portions approach the inward positions thereof.

15. The apparatus of claim 13 wherein the means for selectively pivoting said arm means to said first and second positions comprise means for moving the arm means from the outward positions thereof to the inward positions thereof such that an increasing mechanical force advantage is provided as the first and second arm means portions approach the inward positions thereof.

16. The apparatus of claim 1 wherein the transport assembly comprises frame means further comprising a first frame portion and a second frame portion, and means interconnecting the first and second frame portions for allowing pivoting of one frame portion relative to the other frame portion about a substantially vertical axis, and means for selectively pivoting said one frame portion relative to the other frame portion.

17. The apparatus of claim 16 and means for transporting the transport assembly comprising drive motor means mounted relative to the frame means, first wheel means mounted to the first frame portion, and second wheel means mounted to the second frame portion, and means interconnecting the drive motor means and one of the transport assembly wheel means for driving of said one of the transport assembly wheel means.

18. The apparatus of claim 17 and means interconnecting the drive motor means and the other of the transport assembly wheel means for driving of said other of the transport assembly wheel means.

19. The apparatus of claim 16 wherein the substantially vertical pivot axis is positioned generally adjacent the mid-point of the transport assembly.

20. The apparatus of claim 17 wherein the substantially vertical pivot axis is positioned generally adjacent the mid-point of the transport assembly.

21. The apparatus of claim 1 wherein the transport assembly comprises frame means further comprising a first frame portion and a second frame portion, and means interconnecting the first and second frame portions for allowing pivoting of one frame portion relative to the other frame portion about a substantially horizontal axis disposed longitudinally of the transport assembly.

22. The apparatus of claim 16 wherein the means interconnecting the first and second frame portions further comprise means for allowing pivoting of one frame portion relative to the other frame portion about a substantially horizontal axis disposed longitudinally of the transport assembly.

23. The apparatus of claim 22 and means for transporting the transport assembly comprising drive motor means mounted relative to the frame means, first wheel means mounted to the first frame portion, and second wheel means mounted to the second frame portion, and means interconnecting the drive motor means and one of the transport assembly wheel means for driving of said one of the transport assembly wheel means.

24. The apparatus of claim 23 and means for connecting the drive motor means and the other of the transport assembly wheel means for driving of said other of the transport assembly wheel means.

25. The apparatus of claim 1 wherein the means associated with said transport assembly for selectively applying rotational torque to an irrigation line comprise motor means for applying rotational torque to an irrigation line, and further comprising drive motor means mounted relative to the transport assembly, wheel means mounted to the transport assembly, and means interconnecting the drive motor means and transport assembly wheel means for driving of said transport assembly wheel means, and further comprising means for selectively varying the output speed of the motor means for applying rotational torque to an irrigation line, in relation to the output speed of the drive motor means for transporting the transport assembly, to selectively vary the speed of transport of an irrigation line through rotation thereof relative to the speed of the transport assembly.

26. In combination with an irrigation line supported by and having fixed relative thereto a plurality of wheel means, brace means pivotably attached relative to said irrigation line, said brace means being pivotable to an inward position to lie generally along said irrigation line, and pivotable to an outward position extending relatively from said line, the brace means defining an extended end which may be brought into engagement with the ground upon which the irrigation line is disposed.

27. The apparatus of claim 26 wherein the brace means are pivotably connected relative to the irrigation line at an area generally midway between a pair of adjacent wheel means.

28. The apparatus of claim 27 wherein the brace means comprise a pair of brace members, each pivotably connected relative to the irrigation line, the brace members being pivotable to inward positions relative to the irrigation line to lie substantially therealong, and pivotable to outward positions wherein each brace member extends outwardly from the irrigation line, the brace members in said outward positions extending in generally opposite directions from the irrigation line, the brace members defining respective extended ends which may be simultaneously positioned adjacent the ground on which the irrigation line is disposed with such brace members in their respective outward positions.

29. The apparatus of claim 1 and further comprising said irrigation line, and further comprising brace means pivotably attached relative to such irrigation line, said brace means being pivotable to an inward position to lie generally along said irrigation line, and pivotable to an outward position extending relatively from said irrigation line, the brace means defining an extended end which may be brought into engagement with the ground upon which the irrigation line is disposed.

30. The apparatus of claim 29 wherein the brace means are pivotably connected relative to the irrigation line at an area generally midway between a pair of adjacent wheel means.

31. The apparatus of claim 30 wherein the brace means comprise a pair of brace members, each pivotably connected relative to the irrigation line, the brace members being pivotable to inward positions relative to the irrigation line to lie substantially therealong, and pivotable to outward positions wherein each brace member extends outwardly from the irrigation line, the brace members in said outward positions extending in generally opposite directions from the irrigation line, the brace members defining respective extended ends which may be simultaneously positioned adjacent the ground on which the irrigation line is disposed with such brace members in their respective outward positions.

32. Irrigation apparatus comprising:
a continuous irrigation line supported by and having fixed relative thereto a plurality of wheel means, said wheel means supporting said irrigation line a distance above the ground;
a transport assembly movable to adjacent the irrigation line;
readily attachable means associated with said transport assembly for selectively applying rotational torque to said irrigation line at an area between the ends of said irrigation line, with the transport assembly adjacent the irrigation line, to rotate the irrigation line about the longitudinal axis thereof;
means associated with the transport assembly for allowing removal of the transport assembly from the irrigation line;
said transport assembly being sized to allow passage thereof beneath the continuous irrigation line as said transport assembly is being moved over the ground to effect removal of the transport assembly from the irrigation line.

33. The apparatus of claim 32 wherein the transport assembly comprises frame means, and further comprising arm means pivotably mounted to the frame means, the arm means comprising first and second arm means portions pivotably mounted to the frame means, the first and second arm means portions being pivotable to a first arm means position defining inward positions of the first and second arm means portions, the first and second arm means portions being pivotable to a second arm means position defining outward positions of the first and second arm means portions, wherein the first and second arm means portions define respective recessed areas which cooperate to secure the irrigation line positioned therebetween, with said first and second arm means portions in the inward positions thereof, and means for selectively pivoting the first and second arm means portions to the inward and outward positions thereof, the arm means portions upon movement to the outward positions thereof being lowered sufficiently to allow passage thereof beneath the supported irrigation line upon passage of the transport assembly below said irrigation line.

34. The apparatus of claim 33 wherein the means associated with the transport assembly for selectively applying rotational torque to the irrigation line comprise drive gear means rotatably mounted to the one arm means portion, motor means associated with said transport assembly for selectively driving said drive gear means, and output gear means secured to the irrigation line, through which rotational torque may be applied from the drive gear means to the irrigation line.

35. The apparatus of claim 34 wherein the first and second arm means portions further define camming surfaces as portions of the recessed areas thereof, for urging the irrigation line to seat in the recessed areas upon movement of the first and second arm means portions from their outward to their inward positions, to position an irrigation line relative to the drive gear means with the first and second arm means portions in the inward positions, so that the drive gear means are positioned a chosen distance from the longitudinal axis of the so-secured irrigation line.

36. The apparatus of claim 35 and further comprising a pair of guide members secured to said irrigation line, each defining a surface tapered inwardly in the direction of the other guide member, the tapered surfaces being contactable by the arm means to aid in aligning the drive gear means relative to the output gear means fixed to said irrigation line, along the longitudinal axis of the irrigation line.

37. The apparatus of claim 36 wherein said surface defined by each guide member is an annular conically shaped surface.

38. The apparatus of claim 37 wherein the transport assembly comprises frame means further comprising a first frame portion and a second frame portion, first wheel means mounted to the frame portion, and second wheel means mounted to the second frame portion, and means interconnecting the first and second frame portions for allowing pivoting of one frame portion relative to the other frame portion about a substantially vertical axis, and means for selectively pivoting said one frame portion relative to the other frame portion.

39. Irrigation apparatus comprising:
an irrigation line supported by and having fixed relative thereto a plurality of wheel means, said wheel means supporting said irrigation line a distance above the ground;
a transport assembly movable to adjacent the irrigation line;
means associated with said transport assembly for selectively applying rotational torque to said irrigation line at an area between the ends of said irrigation line, with the transport assembly adjacent the irrigation line, to rotate the irrigation line about the longitudinal axis thereof;
means associated with the transport assembly for allowing removal of the transport assembly from the irrigation line; and
ramp means operatively associated with the irrigation line for providing that the transport assembly may be moved from one side of the irrigation line up the ramp means, over the irrigation line, and down the ramp means to the other side of the irrigation line.

40. The apparatus of claim 26 wherein said brace members are each pivotably connected relative to the irrigation line, and pivotable to inward positions relative to the irrigation line to lie substantially therealong, and pivotable to outward positions wherein each of said first and second brace members extends outwardly from the irrigation line in the same direction therefrom, the brace means further comprising third and fourth brace members, each pivotably connected relative to the irrigation line, and pivotable to inward positions relative to the irrigation line to lie substantially therealong, and pivotable to outward positions wherein each of said third and fourth brace members extends outwardly from the irrigation line in directions generally opposite the extending directions of the first and second brace members respectively, the first, second, third and fourth brace members defining respective extended ends which may be simultaneously positioned adjacent the ground on which the irrigation line is disposed with such brace members in their respective outward positions, the first, second, third and fourth brace members defining ramp means for providing that, with said first, second, third and fourth brace members pivoted to their outward positions, the ramp means may be utilized for travel thereon up the ramp means, over the irrigation line, and down the ramp means to the other side of the irrigation line.

41. The apparatus of claim 40 wherein the first, second, third and fourth brace members are pivotably connected relative to the irrigation line at an area generally midway between a pair of adjacent wheel means.

42. A method of transporting irrigation lines in an irrigation system having elongated main line means and a plurality of irrigation lines extending from one side of the main line means, each irrigation line being connectable to and disconnectable from the main line means, comprising the steps of:
disconnecting each connected irrigation line from the main line means, one after the other in a sequence determined by the order of irrigation lines reached by travel in one direction along the main line means;
moving a transport assembly to each of the plurality of irrigation lines, one after the other in a direction opposite said one direction, each irrigation line being transported by said transport assembly by applying rotational torque thereto generally midway between the ends of said line, each irrigation line being transported one after the other in a sequence determined by the order of irrigation lines reached by travel in said opposite direction; and
connecting the transported irrigation lines to the main line means.

43. The method of claim 42 and further comprising the step of providing the irrigation line to be supported by and to have fixed relative thereto a plurality of wheel means, wherein the step of transporting each of the irrigation lines comprises applying rotational torque to each irrigation line at an area thereof between an adjacent pair of wheel means, to rotate the irrigation line about its longitudinal axis.

44. The method according to claim 43 wherein the step of applying rotational torque to the irrigation line at an area thereof comprises applying rotational torque to the irrigation line at an area thereof generally midway between the ends of the irrigation line.

45. A method of transporting irrigation lines in an irrigation system having elongated main line means, a first plurality of irrigation lines extending from one side of the main line means, and a second plurality of irrigation lines extending from the other side of the main line means, each of the first and second plurality of irrigation lines being connectable to and disconnectable from the main line means, comprising the steps of:
disconnecting each connected irrigation line from the main line means, one after the other in a sequence determined by the order of irrigation lines reached by travel in one direction along the main line means;
moving a transport assembly to each of the first plurality of irrigation lines, one after the other in a direction along the main line means opposite said one direction, each of said first plurality of irrigation lines being transported by said transport assembly by applying rotational torque thereto generally midway between the ends of said line, each irrigation line being transported one after the other in a sequence determined by the order of first irrigation lines reached by travel in said opposite direction;
moving the transport assembly to each of the second plurality of irrigation lines, one after the other in said one direction along the main line means, each of said second plurality of irrigation lines being transported by said transport assembly by applying rotational torque thereto generally midway between the ends of said line, each irrigation line being transported one after the other in a sequence determined by the order of said second irrigation lines reached by travel in said one direction; and connecting each irrigation line to the main line means, one after the other in a sequence determined by the order of irrigation lines reached by travel in said opposite direction along the main line means.

46. The method of claim 45 and further comprising the step of providing the irrigation line to be supported by and to have fixed relative thereto a plurality of wheel means, wherein the step of transporting each of the irrigation lines comprises applying rotational torque to each irrigation line at an area thereof between an adjacent pair of wheel means, to rotate the irrigation line about its longitudinal axis.

47. The method of claim 46 wherein the step of applying rotational torque to the irrigation line at an area thereof comprises applying rotational torque to the irrigation line at an area thereof generally midway between the ends of the irrigation line.

* * * * *